United States Patent
Kato et al.

(10) Patent No.: US 10,233,855 B2
(45) Date of Patent: Mar. 19, 2019

(54) FAILURE DIAGNOSIS APPARATUS FOR DIAGNOSING AN INSUFFICIENT OUTPUT OF AN INTERNAL COMBUSTION ENGINE

(71) Applicant: TOYOTA JIDOSHA KABUSHIKI KAISHA, Toyota-shi (JP)

(72) Inventors: Natsuhiro Kato, Toyota (JP); Masahiro Kachi, Obu (JP); Tsutomu Miyazaki, Miyoshi (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 46 days.

(21) Appl. No.: 15/483,183

(22) Filed: Apr. 10, 2017

(65) Prior Publication Data

US 2017/0298854 A1 Oct. 19, 2017

(30) Foreign Application Priority Data

Apr. 15, 2016 (JP) .................................. 2016-081892
Nov. 11, 2016 (JP) .................................. 2016-220180

(51) Int. Cl.
 G01M 15/05 (2006.01)
 F02D 41/22 (2006.01)
 F02D 11/02 (2006.01)

(52) U.S. Cl.
 CPC .............. *F02D 41/22* (2013.01); *F02D 11/02* (2013.01)

(58) Field of Classification Search
 USPC ............................. 73/114.13, 114.14, 114.15
 See application file for complete search history.

(56) References Cited

U.S. PATENT DOCUMENTS

| 4,492,112 A * | 1/1985 | Igarashi ................. F16H 63/42 701/123 |
| 2012/0150399 A1* | 6/2012 | Kar ....................... F02D 11/105 701/54 |
| 2013/0030674 A1* | 1/2013 | Minase ............. B60W 30/1882 701/110 |
| 2014/0224227 A1* | 8/2014 | Yoshizaki ........... F02D 41/0007 123/559.1 |
| 2016/0229390 A1* | 8/2016 | Takahashi ............. B60W 10/06 |
| 2017/0002758 A1* | 1/2017 | Nishimura .......... G01M 15/042 |

FOREIGN PATENT DOCUMENTS

JP 2014-234113 12/2014

* cited by examiner

*Primary Examiner* — Eric S McCall
(74) *Attorney, Agent, or Firm* — Oblon, McClelland, Maier & Neustadt, L.L.P.

(57) ABSTRACT

A failure diagnosis apparatus for an internal combustion engine is provided. The internal combustion engine is mounted on a vehicle. The failure diagnosis apparatus includes an electronic control unit. The electronic control unit is configured to: measure an abnormal time in which an abnormal state where an accelerator pedal operation amount is equal to or larger than a first specified operation amount and a rate of actual output torque to requested torque is smaller than a specified rate value continues; and record specified data for a failure diagnosis of the internal combustion engine on a recording device in the cases where the abnormal time is equal to or longer than a first specified time that is set in advance and the accelerator pedal operation amount is equal to or larger than a second specified operation amount that is larger than the first specified operation amount.

9 Claims, 11 Drawing Sheets

FAILURE DIAGNOSIS APPARATUS FOR DIAGNOSING AN INSUFFICIENT OUTPUT OF AN INTERNAL COMBUSTION ENGINE

INCORPORATION BY REFERENCE

The disclosure of Japanese Patent Application No. 2016-220180 and 2016-081892 filed on Apr. 15, 2016 and Nov. 11, 2016 including the specification, drawings and abstract is incorporated herein by reference in its entirety.

BACKGROUND

1 Technical Field

The present disclosure relates to a failure diagnosis apparatus that is mounted on a vehicle and records data for failure diagnosis of an internal combustion engine and, in particular, to an apparatus that diagnoses failure by which a driver feels that power of the vehicle is insufficient.

2 Description of Related Art

For an early discovery and an investigation of a cause of failure of an internal combustion engine in a vehicle such as an automobile, various methods for detecting a state where drive data is not normal (that is, abnormal) have conventionally been examined. As one example, it is disclosed in Japanese Patent Application Publication No. 2014-234113 (JP 2014-234113 A) that the drive data is sequentially obtained during a travel of the vehicle, that the obtained data is categorized by a pattern (also called a drive scene) of the drive data that is changed in time series, that a characteristic of each of the patterns is extracted, and that a criterion value for a determination on an abnormality is set on the basis of this characteristic.

More specifically, for example, such an abnormality that a vehicle speed does not normally correspond to depression of an accelerator pedal only occurs at a start-up of the vehicle. In addition, during acceleration after deceleration or the like, values of an accelerator pedal operation amount and the vehicle speed at this time are normally detected. If the abnormality is determined by using the same criterion value in such a case, the abnormality may not be detected at the start-up of the vehicle. In addition, despite a fact that both of the values of the accelerator pedal operation amount and the vehicle speed are normal during the acceleration after the deceleration or the like, an erroneous determination on the abnormality may be made.

In other words, the different criterion values are required for the determination on the abnormality in different travel scenes at the start-up of the vehicle and during the acceleration after the deceleration. For this reason, an apparatus disclosed in JP 2014-234113 A categorizes the drive data of the various drive scenes, for example, time-series data that indicates a relationship between the accelerator pedal operation amount and the vehicle speed, and sets the appropriate criterion value that corresponds to each of the patterns.

SUMMARY

Initially, the apparatus of the related art sequentially obtains the drive data of the vehicle in a broad range of the drive scenes, stores the obtained data with time information, categorizes the obtained data by the pattern of the drive data that is changed in time series, and extracts the characteristic of each of the patterns by a double articulation analysis or the like. Then, based on the characteristic of each of the patterns, the apparatus appropriately sets the determination criterion value of the abnormality by a statistical method.

However, a series of these processes are complicated, which naturally results in a heavy calculation load.

The present disclosure provides a failure diagnosis apparatus for an internal combustion engine that records data for a diagnosis of failure as a cause of insufficient output of the internal combustion engine while not performing complicated processes as described above and thus suppressing a calculation load.

A failure diagnosis apparatus for an internal combustion engine according to one aspect of the present disclosure is provided. The internal combustion engine is mounted on a vehicle. The failure diagnosis apparatus includes an electronic control unit. The electronic control unit is configured to: measure an abnormal time in which an abnormal state where an accelerator pedal operation amount is equal to or larger than a first specified operation amount and a rate of actual output torque to requested torque is smaller than a specified rate value continues; and record specified data for a failure diagnosis of the internal combustion engine on a recording device in the cases where the abnormal time is equal to or longer than a first specified time that is set in advance and the accelerator pedal operation amount is equal to or larger than a second specified operation amount that is larger than the first specified operation amount.

According to the failure diagnosis apparatus of the above aspect, initially, a driver depresses an accelerator pedal during a travel of the vehicle. Then, despite a fact that the accelerator pedal operation amount is equal to or larger than the first specified operation amount, a state where the actual output torque of the internal combustion engine is not sufficiently increased for the requested torque that corresponds to this accelerator pedal operation amount occurs. Here, the requested torque is torque with which requested drive power to the vehicle by the driver can be realized by cooperative control of the internal combustion engine and an automatic transmission, for example. The requested torque is generally calculated by adding loss of torque, which occurs by friction or the like in the internal combustion engine or a power transmission system, to the drive power.

When the rate of the actual output torque to the requested torque is smaller than the specified value, abnormality of insufficient output of the internal combustion engine occurs, and thus there is a high possibility that the driver feels uncomfortable. Accordingly, a time (the abnormal time) in which such an abnormal state continues is measured. Then, in the cases where the measured abnormal time becomes equal to or longer than the time that is set in advance and the accelerator pedal operation amount is equal to or larger than the second specified operation amount that is larger than the first specified operation amount, that is, in the case where the accelerator pedal is further depressed, it is determined that a failure diagnosis is required, and data that is useful for the failure diagnosis or an investigation of a cause is recorded on the recording device.

That is, when the driver further depresses the accelerator pedal while the abnormal state continues, a complicated process as in the related art (JP 2014-234113 A) does not have to be performed. In addition, it is possible to appropriately determine whether it is currently in a situation where the failure diagnosis of the insufficient output of the internal combustion engine is required while an increase in a calculation load is prevented (that is, while the calculation lead is suppressed). In accordance with this determination on a failure state, the data that is useful for the failure diagnosis and the investigation of the cause can be recorded on the recording device.

In the failure diagnosis apparatus according to the above aspect, the electronic control unit may at least store data related to control of the internal combustion engine (for example, an intake air amount, a fuel supply amount, ignition timing, an EGR rate, valve timing, and the like) in a storage device such as RAM (a device that temporarily stores the data) while the abnormal state continues, and may read out this data in accordance with a failure determination and record this data on a recording device such as non-volatile memory.

According to the failure diagnosis apparatus of this aspect, in the case where the failure that leads to the insufficient output of the internal combustion engine, such as clogging of a nozzle hole of a fuel injection valve, possibly occurs, the data is temporarily stored before it is determined that the failure diagnosis is required due to the further depression of the accelerator pedal as described above. In this way, the data can be recorded on the recording device after this case is determined as the failure state. Therefore, similar to the data posterior to the determination, such data prior to the determination can also be useful for the failure diagnosis and the investigation of the cause.

The data that is stored prior to the determination of the failure state may be deleted after all when it is not determined that the failure diagnosis is required. Alternatively, regardless of presence or absence of the determination, the data may be read out from the storage device at a time point at which the abnormal state continues for the time that is set in advance or longer as described above, and may be recorded on the recording device. In this case, the data may be recorded by adding information thereto, and the information is used to distinguish the data from the data that is recorded posterior to the determination. Alternatively, the data may be recorded on another area of the recording device.

In this way, not only in the case where it is determined that the failure diagnosis is required but also in the case where it is not determined that the failure diagnosis is required, the data of the abnormal state can be recorded. This allows examination of two types of the data and is useful for the failure diagnosis and the investigation of the cause. Note that the data in the case where it is not determined that the failure diagnosis is required may be overwritten at specified time intervals. In this way, an unnecessary increase of data capacity in the recording device can be prevented.

By the way, in an environment with low atmospheric pressure such as in a highland, density of air that is suctioned into the internal combustion engine is reduced. Accordingly, such an erroneous determination that engine output is insufficient tends to be made. In the failure diagnosis apparatus according to the above aspect, the specified value that is related to the rate of the actual output torque to the requested torque may be changed to a smaller value as the atmospheric pressure is lowered. Alternatively, the time that is set in advance in relation to the abnormal time may be changed to a longer time as the atmospheric pressure is lowered. According to the failure diagnosis apparatus of this aspect, the erroneous determination can be suppressed.

In addition, as described above, even when the accelerator pedal operation amount is equal to or larger than the first specified operation amount, the driver is possibly satisfied with a feeling of the acceleration of the vehicle to certain extent and thus slightly reduces a depression amount of the accelerator pedal. For this reason, the rate of the actual output torque to the requested torque is possibly smaller than the specified value. In the failure diagnosis apparatus according to the above aspect, the electronic control unit may be configured to interrupt measurement of the abnormal time in the case where an increase rate of the accelerator pedal operation amount is smaller than a specified increase rate threshold even when the accelerator pedal operation amount is equal to or larger than the first specified operation amount. According to the failure diagnosis apparatus of this aspect, the case as described above is eliminated, and thus the measurement accuracy of the abnormal time can be increased.

In the failure diagnosis apparatus according to the above aspect, the electronic control unit may be configured to retain the abnormal time in the case where the abnormal time that has been measured until the increase rate becomes smaller than the threshold is equal to or longer than a second specified time, and to clear the abnormal time in the case where the abnormal time is shorter than the second specified time. According to the failure diagnosis apparatus of this aspect, in the case where the depression amount of the accelerator pedal is slightly reduced after the accelerator pedal is depressed for a certain time or longer, it is considered that an acceleration request by the driver is present and there is a high possibility that the accelerator pedal is depressed again. Thus, it is preferred to retain the measured abnormal time.

On the other hand, in the case where the depression amount of the accelerator pedal is slightly reduced after the accelerator pedal is depressed for a relatively short time instead for the certain time or longer as described above, it is considered that the driver has unconsciously depressed the accelerator pedal and thus the acceleration request is absent. If the measured abnormal time also is retained in such a case, the abnormal time is integrated and eventually becomes equal to or longer than the set time, which possibly leads to the erroneous determination on the abnormality as the insufficient output.

In the cases where the increase rate of the accelerator pedal operation amount becomes smaller than the threshold as described above and the abnormal time that is measured until this time is equal to or longer than the second specified time (that is, the depression amount of the accelerator pedal is slightly reduced after the accelerator pedal is depressed for the certain time or longer), this abnormal time is retained. On the other hand, if the abnormal time is shorter than the second specified time, the abnormal time is cleared to zero. In this way, the erroneous determination can be suppressed.

According to the failure diagnosis apparatus of the above-described aspect, when the driver of the vehicle further depresses the accelerator pedal in a state (the abnormal state) where it can be considered that the abnormality of the insufficient output occurs due to the failure of the internal combustion engine, it is determined that the failure diagnosis is required, and the data is recorded. Accordingly, a complicated process of optimally setting a different criterion value for each drive scene is no longer required. Thus, it is possible to appropriately determine whether the failure diagnosis of the insufficient output is required while the calculation load is suppressed. In addition, the data that is useful for the diagnosis can be recorded.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

A description will hereinafter be made on an embodiment of the present disclosure with reference to the drawings. In this embodiment, a description will be made on a failure diagnosis apparatus for an internal combustion engine (hereinafter referred to as an engine 1) that is mounted on an unillustrated automobile (vehicle) as one example.

Figure 1:
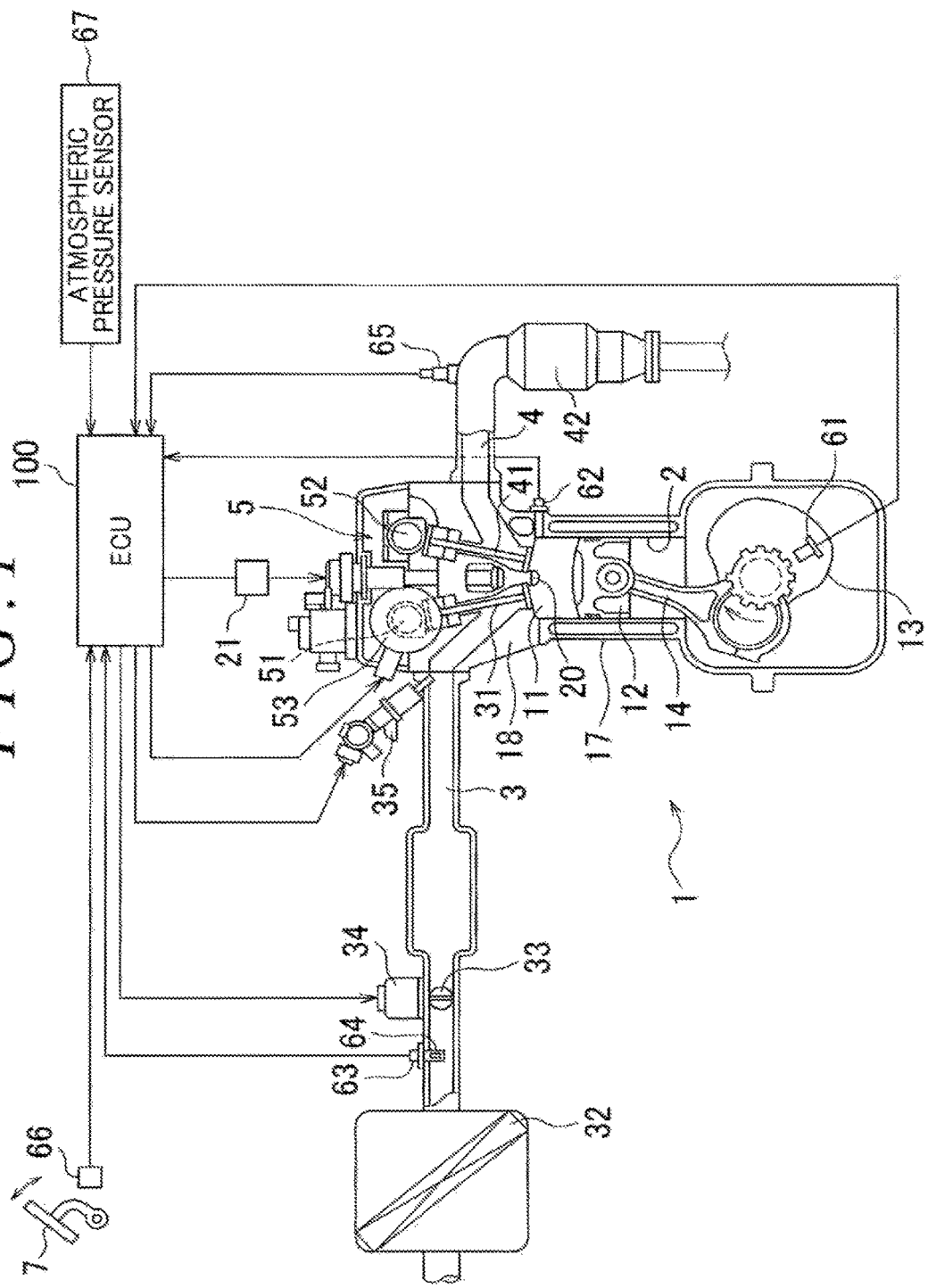
FIG 1 is a schematic configuration view of an engine to which the present disclosure is applied.

—Schematic Configuration of Engine—FIG. 1 shows a schematic configuration of the engine 1 according to the embodiment. As one example, this engine 1 is a multi-cylinder gasoline engine, and a piston 12 is accommodated in each cylinder 2 in a manner to segment a combustion chamber 11. The piston 12 and a crankshaft 13 are coupled by a connecting rod 14, and a crank angle sensor 61 that detects a rotational angle (a crank angle) of the crankshaft 13 is disposed in a lower portion of a cylinder block 17.

Meanwhile, a cylinder head 18 is fastened to an upper portion of the cylinder block 17 and closes an upper end of each of the cylinders 2. In this cylinder head 18, an ignition plug 20 is disposed in a manner to face the inside of each of the cylinders 2. The ignition plug 20 discharges a spark when a high voltage is supplied thereto from an igniter 21 that is controlled by an ECU 100, which will be described below. Note that a coolant temperature sensor 62 that detects a coolant temperature of the engine 1 is disposed in an upper portion of a sidewall of the cylinder block 17.

In addition, an intake passage 3 and an exhaust passage 4 are provided in a manner to communicate with the combustion chamber 11 of each of the cylinders 2. A downstream portion of the intake passage 3 (a downstream side of an intake flow) corresponds to an intake port that is formed in the cylinder head 18, and an intake valve 31 is disposed at an opening at which this intake port faces the combustion chamber 11. Similarly, an upstream portion of the exhaust passage 4 (an upstream side of an exhaust flow) corresponds to an exhaust port, and an exhaust valve 41 is disposed at this opening. A valve system 5 that operates these intake valve 31 and exhaust valve 41 is provided in the cylinder head 18.

As one example, the valve system 5 of this embodiment includes: an intake camshaft 51 that drives the intake valve 31; and an exhaust camshaft 52 that drives the exhaust valve 41. When these two camshafts 51, 52 are driven by the crankshaft 13 via an unillustrated timing chain and the like, the intake valve 31 and the exhaust valve 41 are each opened/closed at specified timing. The intake camshaft 51 includes an electric VVT 53, and the opening/closing timing of the intake valve 31 is controlled by the ECU 100, which will be described below.

In the intake passage 3, an air cleaner 32, an airflow meter 63, an intake air temperature sensor 64 (installed in the airflow meter 63), and an electronically controlled throttle valve 33 are sequentially disposed from an upstream side. This throttle valve 33 is driven by a throttle motor 34 to adjust an intake air amount of the engine 1 by throttling the intake flow. An opening degree of the throttle valve 33 (a throttle opening degree) is controlled by the ECU 100, which will be described below.

In the intake passage 3, an injector 35 for fuel injection is also disposed for each of the cylinders 2. This injector 35 injects the fuel into the intake passage 3 when being controlled by the ECU 100, which will be described below. The fuel, which is injected just as described, is mixed with the intake air, suctioned into the cylinders 2, ignited by the ignition plug 20, and combusted in the combustion chamber 11. Thereafter, generated burned gas flows out to the exhaust passage 4 and is purified by a catalytic converter 42. Note that an air-fuel ratio sensor 65 is disposed on an upstream side of the catalytic converter 42.

Figure 2:
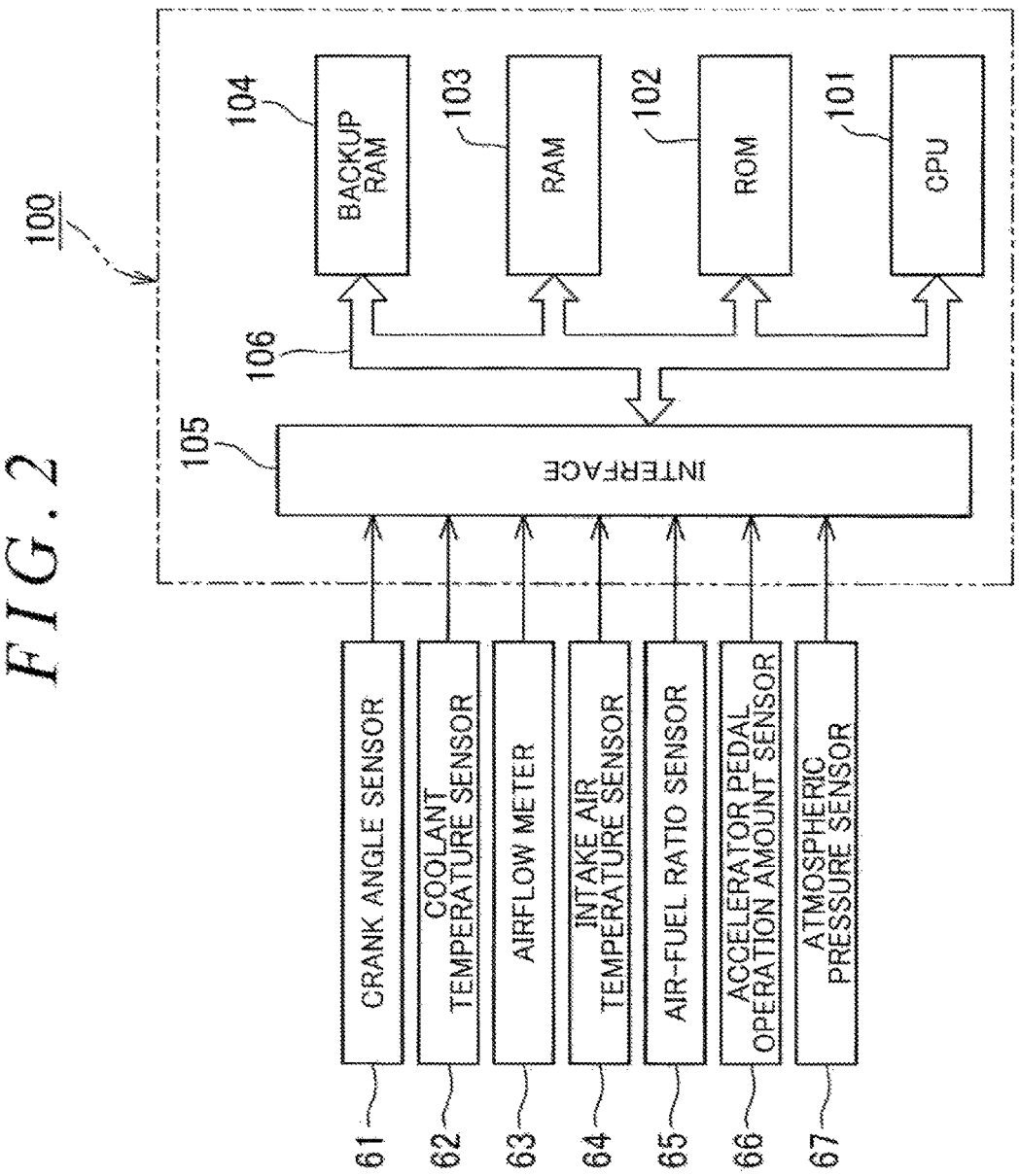
FIG. 2 is a view that schematically illustrates a configuration of an ECU.

—ECU— The ECU 100 is constructed of a known electronic control unit and, as schematically shown in FIG. 2, includes a central processing unit (CPU) 101, read only memory (ROM) 102, random access memory (RAM) 103, backup random access memory (RAM) 104, and the like. The CPU 101 performs various calculation processes on the basis of programs and maps stored in the ROM 102. The ROM 102 stores control programs of the engine 1 and programs for a failure determination, which will be described below, and the like.

The RAM 103 is memory (a storage device) that temporarily stores calculation results by the CPU 101, data received from each of the sensors, and the like. The backup RAM 104 is non-volatile memory that records data and the like to be stored at a stop of the engine 1. In this embodiment, the backup RAM 104 also serves as a recording device that records data for the failure diagnosis as will be described below.

As one example, EPROM, flash (F)-ROM, or the like may be adopted as the backup RAM 104. Note that, in addition to the backup RAM 104, another hard disc drive (HDD) can be provided as the recording device, for example. The CPU 101, the ROM 102, the RAM 103, and the backup RAM 104 are mutually connected by a bus 106 and also connected to an input/output interface 105.

As described above by referring to FIG. 1, the crank angle sensor 61, the coolant temperature sensor 62, the airflow meter 63, the intake air temperature sensor 64, the air-fuel ratio sensor 65, and the like are connected to this interface 105. In addition, as also shown in FIG. 1, an accelerator pedal operation amount sensor 66 and an atmospheric pressure sensor 67 are connected to the interface 105. The accelerator pedal operation amount sensor 66 detects an operation amount of an accelerator pedal that is provided in a vehicle cabin (an accelerator pedal operation amount), and the atmospheric pressure sensor 67 is provided in a manner to face outside of the vehicle cabin. Furthermore, although not shown, sensors and switches that are used for operation control of the engine 1 are connected to the interface 105.

The ECU 100 executes the various control programs on the basis of signals received from the various sensors, switches, and the like, and thereby calculates requested torque to the engine 1 on the basis of the accelerator pedal operation amount, a load and a speed of the engine 1, a vehicle speed, or the like. Then, in order for the engine 1 to output this requested torque, the ECU 100 executes: control of ignition timing by the igniter 21; control of the throttle opening degree by the throttle motor 34 (that is, control of the intake air amount); control of the fuel injection by the injector 35; control of the intake valve timing by the VVT 53; and the like.

Note that the requested torque to the engine 1 is torque with which requested behavior to the vehicle by a driver can be realized by cooperative control of the engine 1 and a transmission. The requested torque is calculated by adding loss of torque, which occurs by friction or the like in the engine 1 or a power transmission system, to drive power requested to the vehicle by the driver. Furthermore, the ECU 100 executes control of recording data for a failure diagnosis of the engine 1 as will be described below.

—Failure Diagnosis Data—As described above, in order to obtain the drive power requested by the driver, the ECU 100 controls the intake air amount, a fuel injection amount, the ignition timing, the valve timing, and the like of the engine 1 on the basis of the requested torque. However, there is a case where the actual output torque of the engine 1 is reduced, for example, due to the reduced throttle opening degree by failure of the throttle motor 34 or due to the reduced fuel injection amount by clogging of a nozzle hole of the injector 35.

In such a case, the vehicle speed may not smoothly be increased in accordance with depression of the accelerator pedal 7 by the driver, from which the failure can be determined. However, a response delay generally occurs in output control of the engine 1, and a magnitude of this delay is changed in accordance with a travel state of the vehicle or the operation by the driver. Thus, it has been difficult to uniformly make a failure determination from a relationship between the accelerator pedal operation amount and a degree of an increase in the vehicle speed (acceleration), for example.

In view of the above, in this embodiment, when the driver further depresses the accelerator pedal 7 in an abnormal state where the output of the engine 1 is insufficient as described above and where it is concerned that failure of some kind occurs, it is determined that the failure diagnosis is required. Then, in accordance with this determination (hereinafter also referred to as a determination on failure), specified data set (freeze frame data, which will be described below) is recorded on the backup RAM 104. A specific description thereon will hereinafter be described with reference to FIG. 3, FIG. 4, and FIG. 5.

Initially, in the ECU 100 of this embodiment, as described above, the CPU 101 updates operation data of the engine 1, that is, signal values from the various sensors and data on the engine speed, the intake air amount, an air-fuel ratio, and the like that are calculated by using these signal values, and stores these in the RAM 103 at specified time intervals. As conventionally known, the RAM 103 has various storage areas. The CPU 101 stores failure diagnosis data, which is set in advance, in time series in a specified area of the RAM 103 and updates the data at specified time intervals.

Note that the failure diagnosis data corresponds to information that is set in advance and recorded for the failure diagnosis of insufficient output of the engine 1 in relation to the operation by the driver or the travel state of the automobile. For example, as the failure diagnosis data, information on an accelerator pedal operation, a brake operation, a steering operation, the vehicle speed, the acceleration, the engine speed, the intake air amount, the fuel injection amount, the ignition timing, the valve timing, and the like is raised.

Figure 3:
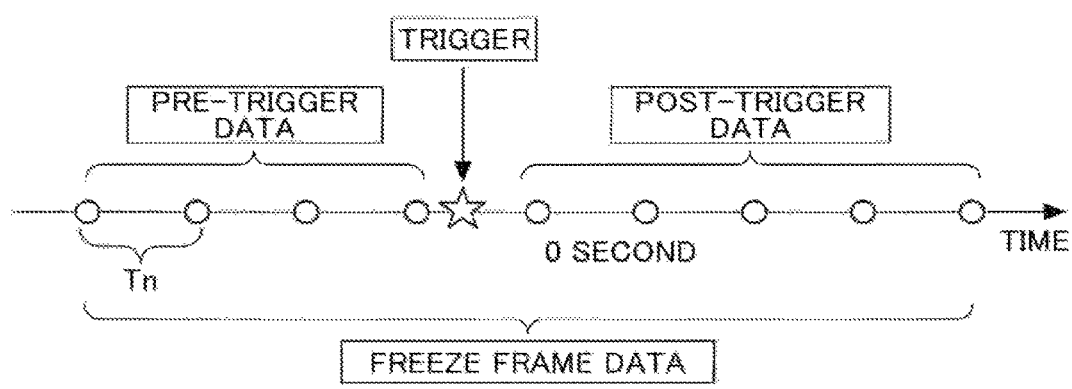
FIG. 3 is a view that schematically illustrates generation of freeze frame data.

As schematically indicated by circles in FIG. 3, these types of the failure diagnosis data are stored in time series and updated at specified time intervals in the RAM 103 while the ECU 100 is ON. More specifically, when an amount of the temporarily stored data exceeds storage capacity, which is set in advance in accordance with a sampling time Tn, the stored data is overwritten with new data beginning from the oldest data.

Then, as will be described below in detail, when it is determined that the failure diagnosis of the insufficient output of the engine 1 is required, a trigger is issued as indicated by a star symbol in FIG. 3. Data at this trigger point, that is, data at a time point of the determination on the failure, data within a specified time prior to the trigger point (pre-trigger data), and data within a specified time posterior to the trigger point (post-trigger data) are read out from the specified region in the RAM 103, set as the freeze frame data, and written in the backup RAM 104.

The data that is recorded on the backup RAM 104, just as described, can be used for an analysis of an investigation of a cause of the failure at a dealer, an automobile maker, and the like, for example. For this reason, although not shown, the ECU 100 is provided with a connection port for a dedicated terminal unit prepared at the dealer and the like. When the dedicated terminal unit is connected to this connection port, the data in the backup RAM 104 can be transferred thereto.

—Procedure of Determination on Failure—In this embodiment, when the driver further depresses the accelerator pedal 7 in a state (the abnormal state) where the engine 1 does not respond to the depression of the accelerator pedal 7 in a timely manner and where it is thus concerned that failure occurs, the ECU 100 determines that the failure diagnosis is required. A description will hereinafter be made on a procedure of the determination executed by the CPU 101 with reference to a flowchart in FIG. 4. Note that this routine is repeatedly executed at specified timing while the ECU 100 is ON.

Initially, when the routine is started (START), it is determined in step ST1 whether a depression amount of the accelerator pedal 7 by the driver is equal to or larger than a specified amount (an accelerator pedal operation amount Acc≥a first specified operation amount Acc1) on the basis of the signal from the accelerator pedal operation amount sensor 66. This is made to determine that the driver performs a depression operation of the accelerator pedal for a certain amount or larger. The first specified operation amount Acc1 may be set about 50%, for example.

If Acc<Acc1 and a negative determination (NO) is made, the routine is terminated (END). On the other hand, if Acc≥Acc1 and a positive determination (YES) is made, the process proceeds to step ST2. Then, it is determined whether a rate of actual output torque Tact to requested torque Treq of the engine 1 (Tact/Treq: hereinafter also referred to as a torque achievement rate) is smaller than a specified value a.

This specified value a is a threshold that is used to detect whether it is currently in a normal state or not a normal (that is, abnormal) state and for which a delay in the engine control being taken into consideration. The specified value a may be set about 0.65, for example.

As a result of the determination, if (Tact/Treq)≥a and a negative determination (NO) is made, the process proceeds to step ST3. Then, a count value of an abnormal time, which will be described below, is cleared, and the routine is terminated. On the other hand, if (Tact/Treq)<a and a positive determination (YES) is made, the process proceeds to step ST4, and counting (time measurement) of the abnormal time is started. That is, a time in which the abnormal state continues is measured by distinguishing the abnormal state from a temporal delay in a transient operation state, for example.

In following step ST5, it is determined whether the abnormal time becomes equal to or longer than a time (a set time), which is set in advance. If the abnormal time is shorter than the set time and a negative determination is made, the routine is terminated. Thereafter, the routine is executed again while the count value of the abnormal time is retained. Then, if the positive determination (YES) is made in each of steps ST1 and ST2, the abnormal time is counted again in step ST4. In this way, when the abnormal state of the insufficient output continues, the count value of the abnormal time is increased.

Then, if the abnormal time becomes equal to or longer than the set time as described above, a positive determination (YES) is made in step ST5, and the process proceeds to step ST6. Then, it is determined whether the accelerator pedal 7 is further depressed (the accelerator pedal operation amount Acc≥a second specified operation amount Acc2). In order to distinguish further depression from a fluctuation in the accelerator pedal operation amount Acc, which is not considered as the further depression, this second specified operation amount Acc2 may be set to be sufficiently larger than the first specified operation amount Acc1 and may be set about 80%, for example.

If Acc<Acc2 and a negative determination (NO) is made in step ST6, the routine is terminated. In this case, when the failure does not occur, the routine is repeated, and (Tact/Treq)≥a is eventually satisfied. Thereafter, the negative determination (NO) is made in step ST2, and the count value of the abnormal time is cleared in step ST3. On the other hand, if Acc≥Acc2 and such a positive determination (YES) that the accelerator pedal is further depressed is made, the process proceeds to step ST7. Then, it is determined that the output is insufficient and thus the failure diagnosis is required. Thus, a failure determination flag is turned ON.

Next, in step ST8, it is determined whether history of the failure determination (that is, history of the determination that the failure diagnosis is required) is absent. If a negative determination (NO) that the history is present is made from a state of the failure determination flag, the routine is terminated. On the other hand, if a positive determination (YES) that the history is absent is made, the process proceeds to step ST9. Then, as described above by referring to FIG. 3, the data is recorded. More specifically, the freeze frame data, which is read out from the RAM 103, is written in the backup RAM 104, and the routine is terminated (END).

Figure 4:
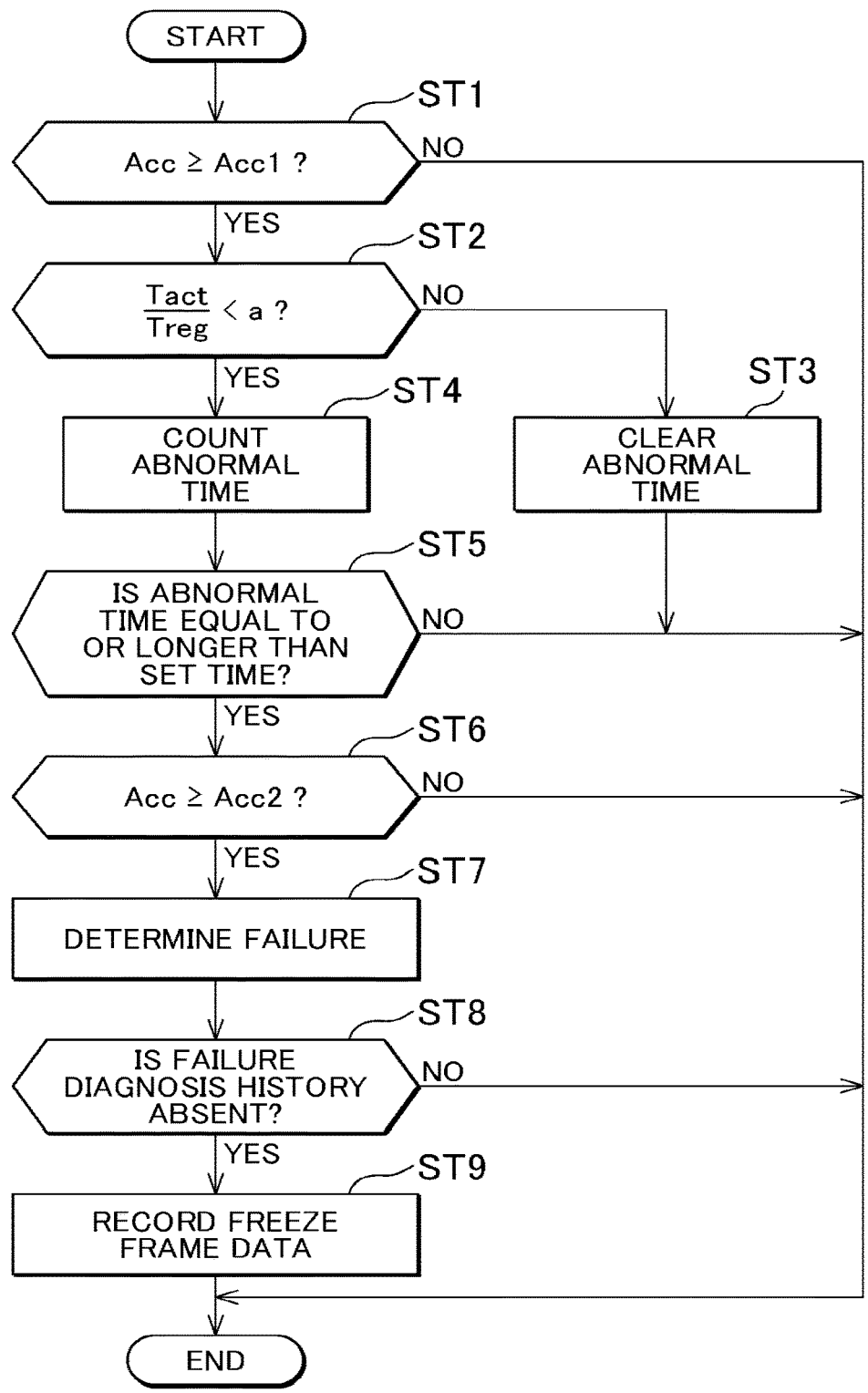
FIG. 4 is a flowchart of one example of control from a determination on failure to recording of data.

By executing steps ST1, ST2, and ST4 in the flow shown in FIG. 4, the CPU 101 of the ECU 100 is configured to count the time (the abnormal time) in which the abnormal state where the accelerator pedal operation amount Acc is equal to or larger than the first specified operation amount Acc1 and the ratio of the actual output torque Tact to the requested torque Treq to the engine 1, that is, the torque achievement rate (Tact/Treq) is smaller than the specified value a continues.

In addition, by executing steps ST5 to ST7, the CPU 101 is configured to determine that the failure diagnosis is required in the cases where the abnormal time is equal to or longer than the set time and the accelerator pedal operation amount Acc becomes equal to or larger than the second specified operation amount Acc2, which is larger than the first specified operation amount Acc1. By executing step ST9, the CPU 101 is configured to record the failure diagnosis data of the engine 1 on the backup RAM 104 in accordance with the above determination.

Figure 5:
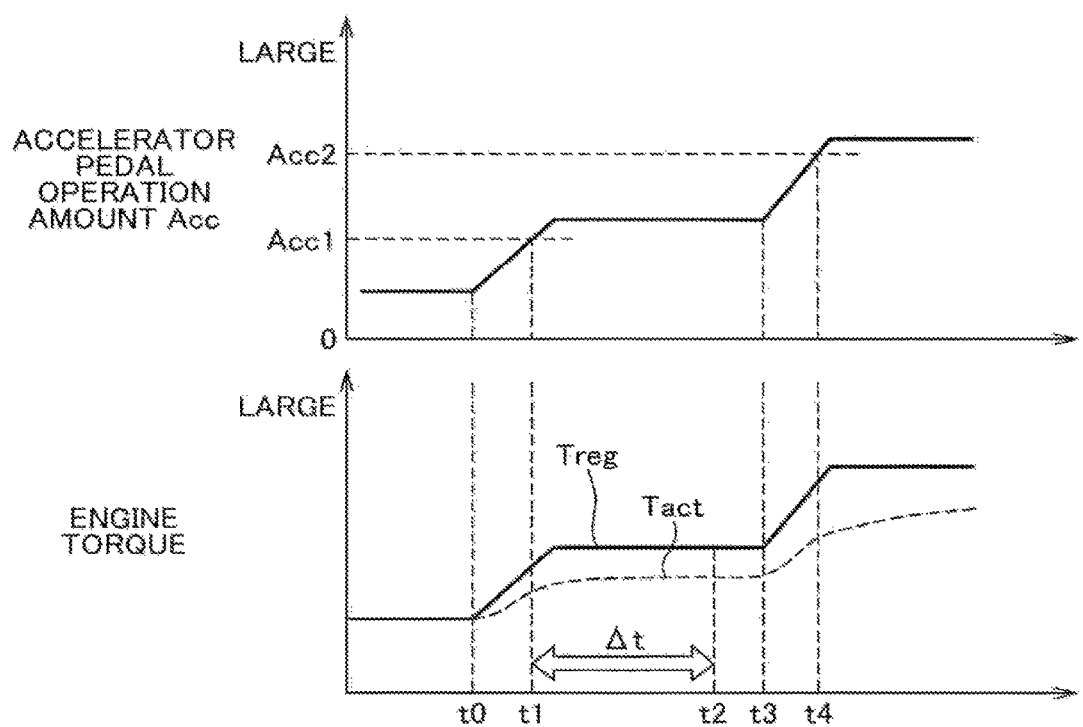
FIG. 5 is a timing chart of one example of changes in an accelerator pedal operation amount and engine torque during the determination on the failure.

As it has been described so far, in this embodiment, when the driver initially performs the depression operation of the accelerator pedal 7 during the travel of the automobile, as indicated at time t0 in a timing chart of FIG. 5, the accelerator pedal operation amount Acc starts being increased. Then, at time t1, the accelerator pedal operation amount Acc becomes equal to or larger than the first specified operation amount Acc1. At this time, in the case where the actual output torque Tact is not smoothly increased despite a fact that the requested torque Treq is increased in accordance with this increase in the accelerator pedal operation amount Acc, the abnormal state where the torque achievement rate (Tact/Treq) as the rate of those is smaller than the specified value a occurs.

Just as described, in the case where the abnormal state where the actual output torque Tact of the engine 1 is not increased smoothly continues for a certain time, there is a possibility that a certain type of the failure occurs. Thus, the time (the abnormal time) in which the abnormal state continues is counted from the time t1. Thereafter, after the abnormal time becomes equal to or longer than set time Δt (for example, about two seconds) at time t2, the driver further depresses the accelerator pedal 7 (time t3). In this way, the accelerator pedal operation amount Acc becomes equal to or larger than the second specified operation amount Acc2 (time t4), and it is determined that the failure diagnosis is required.

In other words, when the driver further depresses the accelerator pedal 7 in the abnormal state where the failure of the insufficient output of the engine 1 possibly occurs, it is determined that the failure diagnosis is required. Criteria (the first and second specified operation amounts Acc1, Acc2 of the accelerator pedal operation amount Acc, the specified value a of the torque achievement rate (Tact/Treq), and the like) for the determination on the abnormal state are common for various drive scenes such as the travel state of the automobile.

Accordingly, complicated processes for setting those criterion values to different optimum values in accordance with the drive scenes are no longer required. Thus, while a calculation load of the CPU 101 is suppressed, the CPU 101 can appropriately determine whether the failure diagnosis is required and can record the failure diagnosis data that is useful for the analysis thereafter.

In addition, in this embodiment, the data on the operation control of the engine 1 is temporarily stored in the RAM 103 before the determination on the failure is made as described above. Then, the data is read out in accordance with the determination and recorded on the backup RAM 104. In this way, the data prior to the determination that the failure diagnosis is required, such as a reduction in the fuel injection amount by clogging of the nozzle hole of the injector 35 or the like, for example, can also be recorded in the similar manner to the data posterior to the determination and can be useful for the investigation of the cause of the failure.

Note that the data that is temporarily stored in the RAM 103 prior to the determination on the failure, just as described, is overwritten (that is, deleted) with the new data in the case where the determination is not made. Thus, the capacity of the RAM 103 and the capacity of the backup RAM 104 are not increased unnecessarily.

—Modified Example 1 — By the way, when the automobile is in an environment with the low atmospheric pressure such as in a highland, density of air that is auctioned into the engine 1 is reduced. Accordingly, the output of the engine 1 tends to be reduced, which facilitates an erroneous determination that the abnormality of the insufficient output occurs. In view of this, it is preferred to correct at least one of the determination criteria in steps ST2 and ST5 in the flow shown in FIG. 4, that is, the specified value a of the torque achievement rate (Tact/Treq) and the set time for the abnormal time in accordance with the atmospheric pressure or the density of the air.

Figure 6:
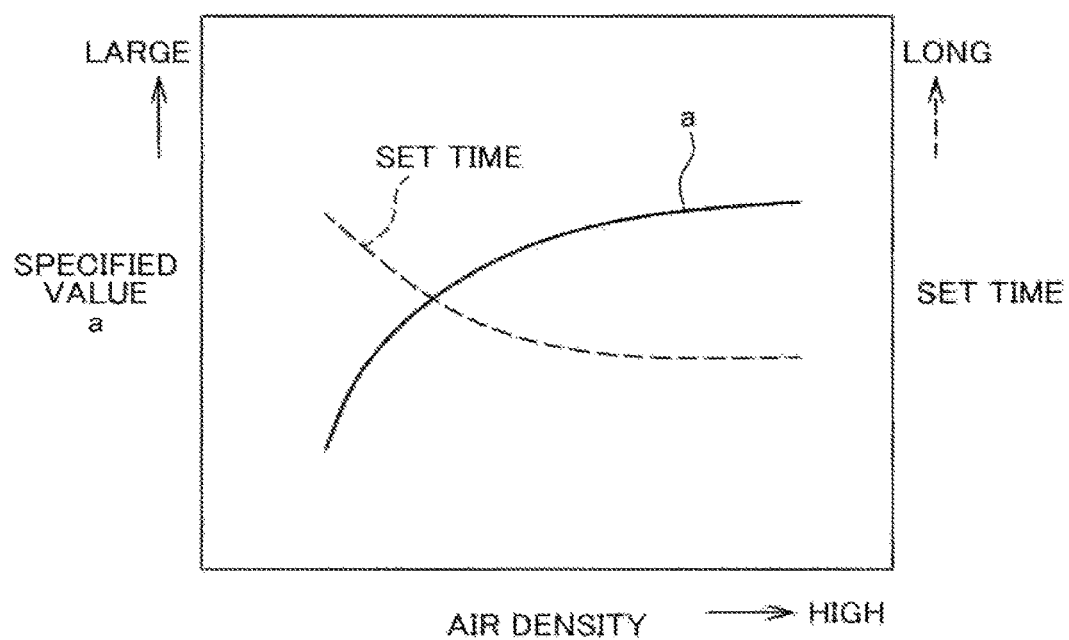
FIG. 6 is an image chart of a map that is used to correct each of a specified value of a torque achievement rate or a set time for an abnormal time in accordance with air density in Modified Example 1.

More specifically, in Modified Example 1, the air density is calculated on the basis of the signal from the atmospheric pressure sensor 67. Then, by referring to a map in FIG. 6, in which one example is shown, at least one type of the correction is made. That is, the specified value a is changed to a smaller value as indicated by a solid line in the graph in the same map or the set time is changed to a longer time as indicated by a broken line in the graph therein as the air density is lowered. This map may be set in advance by a simulation or the like on the basis of a change in the engine torque that is caused by a change in the air density.

By correcting at least one of the specified value a and the set time, just as described, the determination criteria for the abnormal state are appropriately relaxed (that is, the abnormal state is less likely to be determined). Thus, even in the case where the torque of the engine 1 tends to be reduced due to the lowered air density while the automobile travels in the highland, for example, the erroneous determination on the abnormality as the insufficient output, winch is caused by the reduced torque, is suppressed.

—Modified Example 2—Next, a description will be made on a case where a method for counting the abnormal time is changed (Modified Example 2). In the above embodiment, it is determined that the acceleration request is made in the case where the driver performs a depression operation of the accelerator pedal for a certain amount or larger when the accelerator pedal operation amount Acc is equal to or larger than the first specified operation amount Acc1. Then, despite the fact, when the torque achievement rate (Tact/Treq) is equal to or smaller than the specified value a, the time in which this state continues is counted as the abnormal time.

However, there can also be a case where the driver is satisfied with a feeling of the acceleration of the vehicle to certain extent and thus slightly reduces the depression amount of the accelerator pedal 7 even when the accelerator pedal operation amount Acc is equal to or larger than the first specified operation amount Acc1. In this case, the torque achievement rate (Tact/Treq) may not significantly be increased. In view of this, in Modified Example 2, a description will be focused on an increase rate ΔAcc (an integral value as one example) of the accelerator pedal operation amount Acc. When the increase rate ΔAcc is smaller than a specified threshold b (for example, −1.5%), it is considered that the driver slightly reduces the depression amount of the accelerator pedal 7, and counting of the abnormal time is interrupted.

Figure 7:
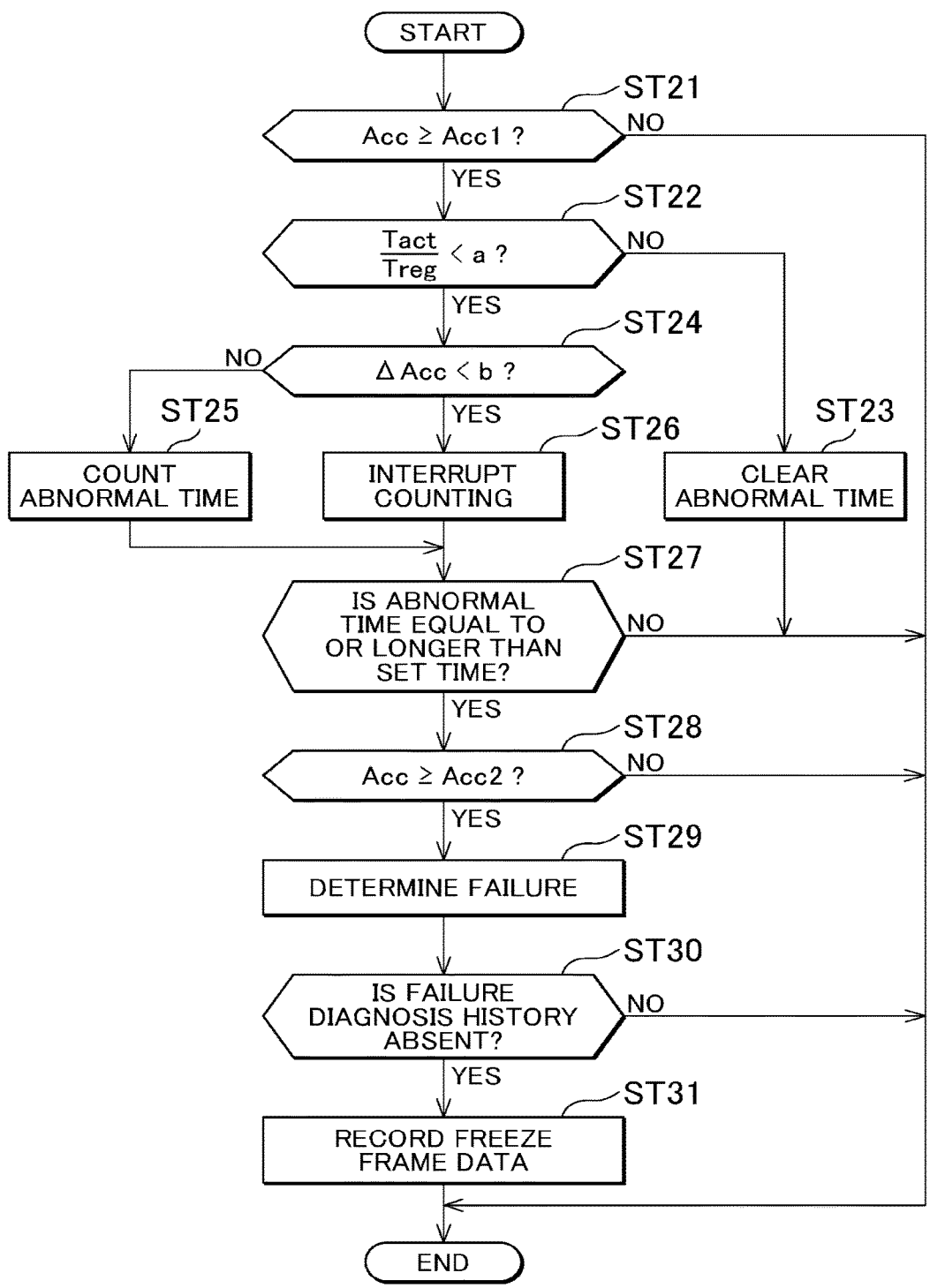
FIG. 7 is a flowchart according to Modified Example 2 which corresponds to FIG. 4 and in which counting of the abnormal time is interrupted when an accelerator pedal operation amount increase rate is smaller than a threshold.

More specifically, in steps ST21 to ST23 in a flowchart shown in FIG. 7, the same processes as those in steps ST1 to ST3 in the flow shown in FIG. 4 are performed. Then, it is determined in step ST24 whether the accelerator pedal operation amount increase rate ΔAcc is smaller than the threshold b (ΔAcc<b). If a negative determination (NO) is made, the process proceeds to step ST25. Then, as same as step ST4 in the flow shown in FIG. 4, the abnormal time is counted. Thereafter, in steps ST27 to ST31, the same processes as those in steps ST5 to ST9 in the flow shown in FIG. 4 are performed.

Figure 8:
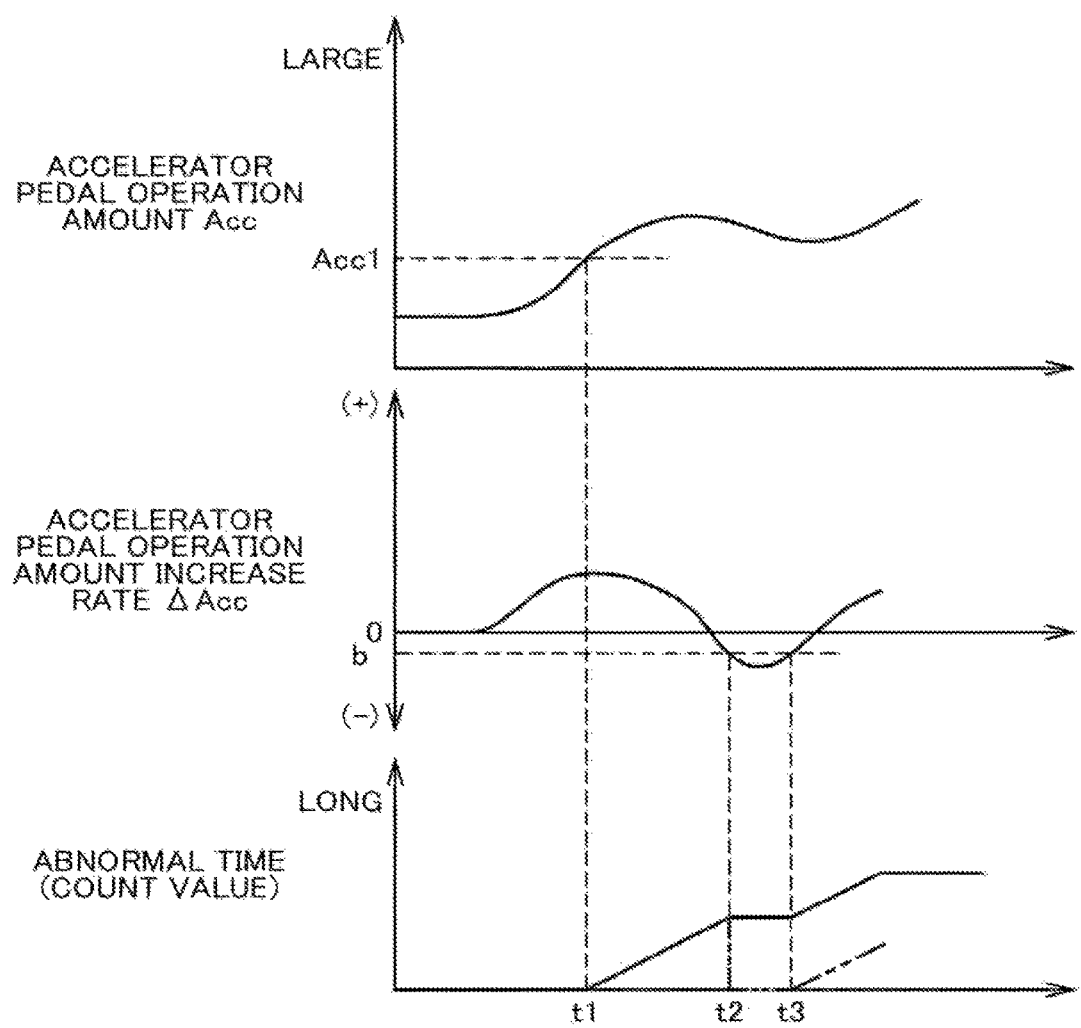
FIG. 8 is a timing chart according to Modified Example 2 which corresponds to FIG. 5.

On the other hand, if the accelerator pedal operation amount increase rate ΔAcc is smaller than the threshold b, a positive determination (YES) is made, and the process proceeds to step ST26. Then, counting of the abnormal time is interrupted, and the process proceeds to steps ST27 to ST31. More specifically, as shown in a timing chart shown in FIG. 8 as one example, when the accelerator pedal operation amount Acc becomes equal to or larger than the first specified operation amount Acc1 at time t1, counting of the abnormal time is started. Thereafter, the driver slightly reduces the depression amount of the accelerator pedal 7, and the accelerator pedal operation amount increase rate ΔAcc becomes smaller than the threshold b at time t2. At this time, counting of the abnormal time is interrupted.

Then as indicated by a solid line in the graph in a lower portion of the same chart, the count value so far is retained as is. Thereafter, the accelerator pedal 7 is depressed again, and the accelerator pedal operation amount increase rate ΔAcc becomes equal to or larger than the threshold b at time t3. At this time, counting of the abnormal time is resumed. Note that, as indicated by a phantom line in the graph in the same chart, when counting of the abnormal time is interrupted, the count value so far may be cleared to zero. In this case, counting of the abnormal time is newly started from the time t3.

According to this Modified Example 2, in the case where the driver slightly reduces the depression amount of the accelerator pedal 7 when the accelerator pedal operation amount Acc is equal to or larger than the first specified operation amount Acc1, counting is interrupted. In this way, measurement accuracy of the abnormal time can be increased. Note that, also in this Modified Example 2, the CPU 101 of the ECU 100 is configured to count the abnormal time by performing steps ST21, ST22, and ST24 to ST26 in the flow shown in FIG. 7. In addition, the CPU 101 of the ECU 100 is configured to determine the failure state by performing steps ST27 to ST29 and to record the failure diagnosis data by performing step ST31.

—Modified Example 3—Next, a description will be made on Modified Example 3. In this Example, in the cases where the depression amount of the accelerator pedal 7 is slightly reduced and counting of the abnormal time is interrupted as in Modified Example 2, the count value is retained or cleared in accordance with this count value so far. More specifically, in the case where the depression amount of the accelerator pedal 7 is slightly reduced after the accelerator pedal 7 is depressed for a certain time or longer, it is considered that the acceleration request by the driver is present and there is a high possibility that the accelerator pedal 7 is depressed again. Accordingly, in this case, it is preferred to retain the count value of the abnormal time and resume counting later.

On the other hand, in the case where the depression amount of the accelerator pedal 7 is slightly reduced after the accelerator pedal 7 is depressed for a relatively short time instead for the certain time or longer as described above, it is considered that the driver has unconsciously depressed the accelerator pedal 7 and thus the acceleration request by the driver is absent. When the count value of the abnormal time is retained in such a case, the count value is repeatedly integrated. As a result, the counted abnormal time becomes equal to or longer than the set time, which possibly leads to the erroneous determination on the abnormality as the insufficient output.

In view of the above, in this Modified Example 3, in the cases where the accelerator pedal operation amount Acc is equal to or larger than the first specified operation amount Acc1, the accelerator pedal operation amount increase rate ΔAcc becomes smaller than the threshold b, and the abnormal time that has been counted so far is equal to or longer than a specified time (a time that corresponds to the change in the accelerator pedal operation amount Acc for a short time and with which it can be considered that the acceleration request by the driver is absent, for example, about 0.5 second), the count value of this abnormal time is retained. On the other hand, in the case where the abnormal time that has been counted so far is shorter than the specified time, the count value is cleared to zero.

Figure 9:
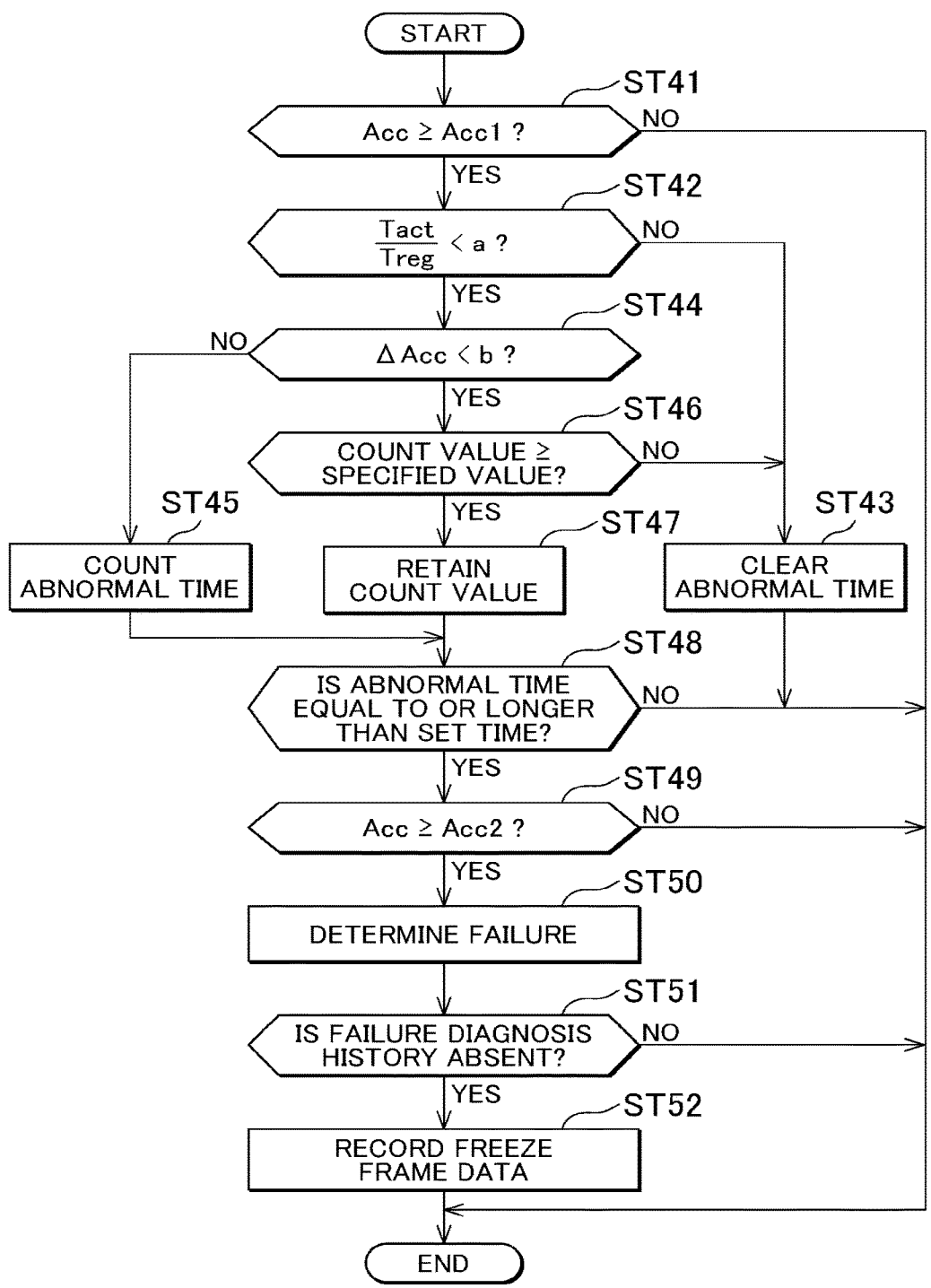
FIG. 9 is a flowchart according to Modified Example 3 which corresponds to FIGS. 4 and 7 and in which a count value at a time when counting of the abnormal time is interrupted is retained or cleared in accordance with this count value.

More specifically, initially, in steps ST41 to ST44 in a flowchart shown in FIG. 9, the same processes as those in steps ST21 to ST24 in the flow shown in FIG. 7 are performed. Then, in step ST44, if the accelerator pedal operation amount increase rate ΔAcc is not smaller than the threshold b and thus a negative determination (NO) is made, the process proceeds to step ST45, and the abnormal time is counted in the same manner as in step ST25 in the flow shown in FIG. 7. Thereafter, in steps ST48 to ST52, the same processes as those in steps ST27 to ST31 in the flow shown in FIG. 7 are performed.

On the other hand, in step ST44, if the accelerator pedal operation amount increase rate ΔAcc is smaller than the threshold b and thus a positive determination (YES) is made, the process proceeds to step ST46. Then, it is determined whether the count value of the abnormal time is equal to or larger than a specified value (a value corresponding to the specified time). If the count value of the abnormal time is smaller than the specified value and thus a negative determination (NO) is made, counting of the abnormal time is interrupted. Then, the process proceeds to step ST43, and the count value of the abnormal time is cleared to zero.

Figure 10:
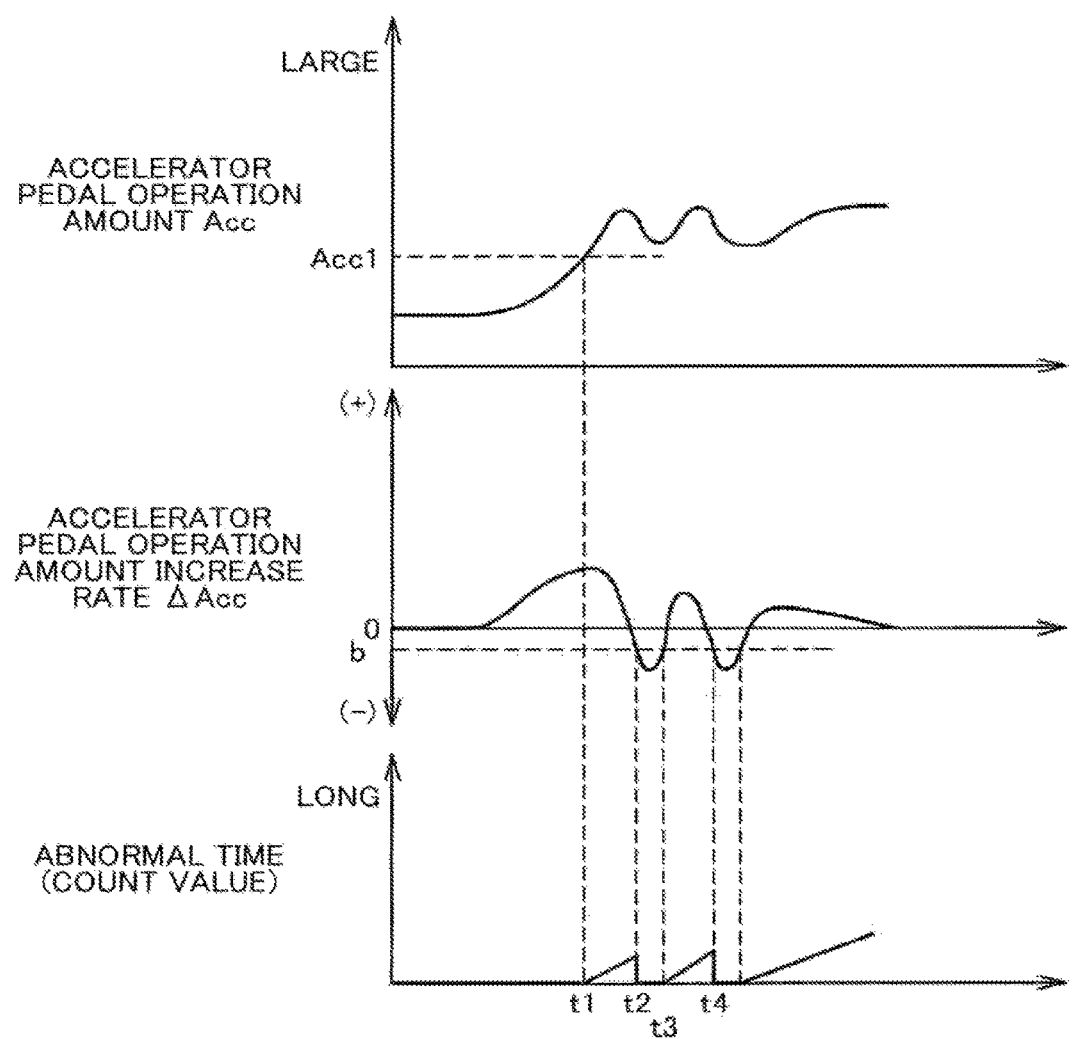
FIG 10 is a timing chart according to Modified Example 3 which corresponds to FIGS. 5 and 8.

More specifically, as shown in a timing chart in FIG. 10 as one example, when the accelerator pedal operation amount Acc becomes equal to or larger than the first specified operation amount Acc1 (time t1), counting of the abnormal time is started. Thereafter, the depression amount of the accelerator pedal 7 is slightly reduced, and the accelerator pedal operation amount increase rate ΔAcc becomes smaller than the threshold b (time t2). At this time, counting of the abnormal time is interrupted as in the Modified Example 2. In the case where the count value that corresponds to the abnormal time (t1 to t2) is smaller than the specified value at this time, the accelerator pedal operation amount Acc is changed for the short time, and it is thus considered that the acceleration request by the driver is absent.

In view of the above, in this case, the count value of the abnormal time is cleared to zero. Thereafter, the accelerator pedal 7 is depressed again, and the accelerator pedal operation amount increase rate ΔAcc becomes equal to or larger than the threshold b (time t3). At this time, counting of the abnormal time is newly started. Thereafter, the depression amount of the accelerator pedal 7 is slightly reduced again, and the accelerator pedal operation amount increase rate ΔAcc becomes smaller than the threshold b (time t4). Then, counting of the abnormal time is interrupted as described above. At this time, the count value that corresponds to the abnormal time (t3 to t4) is smaller than the specified value, and thus the count value of the abnormal time is cleared again.

That is, in the case where the accelerator pedal 7 is depressed for the short time or the depression amount of the accelerator pedal 7 is slightly reduced, it is considered that the driver has unconsciously depressed the accelerator pedal 7 and thus the acceleration request is absent. In this case, the count value of the abnormal time is cleared to zero.

On the other hand, in step ST46 in the flow shown in FIG. 9, if the count value is equal to or larger than the specified value and thus a positive determination (YES) is made, the process proceeds to step ST47. Then, counting of the abnormal time is interrupted, the count value up to this time is retained, and the process proceeds to steps ST48 to ST52. More specifically, in the case where the depression amount of the accelerator pedal 7 is slightly reduced after the accelerator pedal 7 is depressed for the certain time or longer as in Modified Example 2, it is considered that the acceleration request by the driver is present and there is the high possibility that the accelerator pedal 7 is depressed again. In this case, the count value of the abnormal time is retained.

According to Modified Example 3, just as described, in the case where the abnormal time (the count value) so far is shorter than the specified time when counting of the abnormal time is interrupted, it is considered that the acceleration request by the driver is absent. Then, the count value is cleared. In this way, it is possible to suppress a situation where the abnormal time becomes equal to or longer than the set time as a result of the integration of the count value despite a fact that the acceleration request is absent, which leads to the erroneous determination on the abnormality as the insufficient output. Therefore, the measurement accuracy of the abnormal time is increased.

Note that, also in this Modified Example 3, the CPU 101 of the ECU 100 is configured to count the abnormal time by performing steps ST41, ST42, and ST44 to ST47 in the flow shown in FIG. 9. In addition, the CPU 101 of the ECU 100 is configured to determine the failure state by performing steps ST48 to ST50 and to record the failure diagnosis data by performing step ST52.

—Another Embodiment —The embodiment (including Modified Examples 1 to 3) that has been described so far is merely one example and thus has no intention of limiting the configuration, application, and the like of the present disclosure. For example, in the above embodiment, only when the further depression of the accelerator pedal is determined (YES) in step ST6 in the flow shown in FIG. 4, that is, only when it is determined that the failure diagnosis is required, the failure diagnosis data is recorded on the backup RAM 104. However, the present disclosure is not limited thereto. For example, such data may also be recorded when the abnormal time becomes equal to or longer than the set time.

Figure 11:
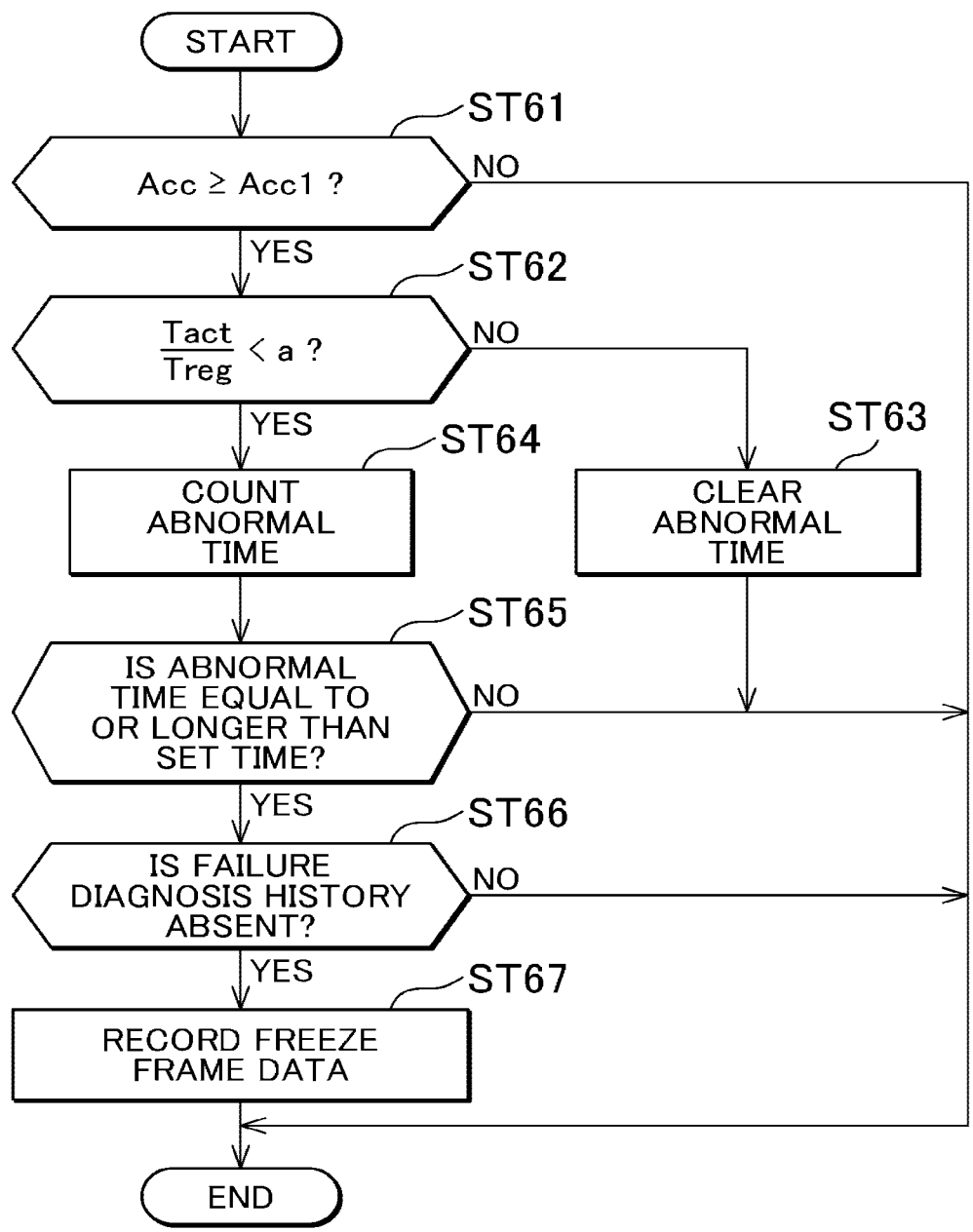
FIG. 11 is a flowchart according to another embodiment which corresponds to FIG. 4 and in which the data is recorded regardless of the determination on the failure.

More specifically, in a flowchart shown in FIG. 11 as one example, in steps ST61 to ST65, the same processes as those in steps ST1 to ST5 in the flow shown in FIG. 4 are performed. Then, in step ST65, if the abnormal time becomes equal to or longer than the set time and thus a positive determination (YES) is made, the process proceeds to step ST66. Here, similar to step ST8 in the flow shown in FIG. 4, it is determined whether the history of the failure determination is absent. If a positive determination (YES) is made, the process proceeds to step ST67. Then, the freeze frame data is recorded as in step ST9, and the routine is terminated.

As described above, when the abnormal state continues for the time, which is set in advance, or longer, the data is recorded regardless of the determination on the failure. In this way, not only in the case where it is determined that the failure diagnosis is required but also in the case where it is not determined that the failure diagnosis is required, the data of the abnormal state can be examined. This is useful for the investigation of the cause of the failure.

Note that, when simplification of the process or suppression of the calculation load is set as a top priority, the freeze frame data is not generated as in the embodiment. Instead, as an easy method, engine control data at a time of the determination on the failure may be read out from the RAM 103 and recorded on the backup RAM 104. In this case, the RAM 103 does not serve as the storage device (the storage device that at least stores the data related to the control of the engine 1 while the abnormal state continues), which is the component of the present disclosure. Accordingly, while including the backup RAM 104 as the recording device, the failure diagnosis apparatus does not include the storage device.

Furthermore, as described above, not only in the case where it is determined that the failure diagnosis is required but also in the case where it is not determined that the failure diagnosis is required, the data is recorded on the backup RAM 104. In this case, identification information that is used to distinguish those two types of the data from each other is preferably added to the data before the data is recorded. Alternatively, it is preferred to record those two types of the data in different areas of the backup RAM 104. The data in the case where it is not determined that the failure diagnosis is required may be overwritten and updated at specified time intervals.

Moreover, in the above embodiment, as the one example, the case where the failure diagnosis apparatus is configured by using the ECU 100 of the engine 1 has been described. However, embodiments of the present disclosure is not limited thereto. Another electronic control unit may be connected to the ECU 100 in a mutually communicable manner, and the failure diagnosis apparatus may thereby be configured. In addition, the failure diagnosis apparatus is not limited to that mounted on the automobile. The present disclosure can also be mounted on a motorcycle, an industrial vehicle, and the like, for example.

According to the failure diagnosis apparatus of the present disclosure, the determination on the failure of the insufficient output of the internal combustion engine can appropriately be made, and the data for the diagnosis thereof can be recorded. Therefore, the present disclosure is particularly useful when being mounted on the automobile.

What is claimed is:

1. A failure diagnosis apparatus for an internal combustion engine, the internal combustion engine being mounted on a vehicle, the failure diagnosis apparatus comprising:
    an electronic control unit including:
    a processor,
    a first semiconductor memory storing instructions, and
    an interface for receiving a plurality of sensor signals, each of the plurality of sensor signals output from a corresponding one of a plurality of sensors including at least a crank angle sensor, a vehicle speed sensor, and an acceleration pedal operation amount sensor, wherein the processor, by processing the instructions, is configured to:
    measure an abnormal time in which an abnormal state continues, the abnormal state including a state where an accelerator pedal operation amount, as determined by processing the sensor signal of the acceleration pedal operation amount sensor, is equal to or larger than a first specified operation amount and a rate of actual output torque to requested torque is smaller than a specified rate value; and
    record specified data for a failure diagnosis of the internal combustion engine on a second semiconductor memory in a case where the abnormal time is equal to or longer than a first specified time that is set in advance and the accelerator pedal operation amount, as determined by processing the sensor signal of the acceleration pedal operation amount sensor, is equal to or larger than a second specified operation amount that is larger than the first specified operation amount.

2. The failure diagnosis apparatus according to claim 1, wherein the processor is configured to set the specified rate value to a smaller value as atmospheric pressure is lowered.

3. The failure diagnosis apparatus according to claim 1, wherein the processor is configured to set the first specified time to a longer time as atmospheric pressure is lowered.

4. The failure diagnosis apparatus according to claim 1, wherein the processor is configured to interrupt measurement of the abnormal time in a case where an increase rate of the accelerator pedal operation amount, as determined by processing the sensor signal of the acceleration pedal operation amount sensor, is smaller than a specified increase rate threshold even when the accelerator pedal operation amount, as determined by processing the sensor signal of the acceleration pedal operation amount sensor, is equal to or larger than the first specified operation amount.

5. The failure diagnosis apparatus according to claim 1, wherein the processor is configured to:
    at least store data related to control of the internal combustion engine in a third semiconductor memory while the abnormal state continues, and
    read out the data from the third semiconductor memory and record the data on the second semiconductor memory in the case where the abnormal time is equal to or longer than the first specified time that is set in advance and the accelerator pedal operation amount, as determined by processing the sensor signal of the acceleration pedal operation amount sensor, is equal to or larger than the second specified operation amount that is larger than the first specified operation amount.

6. The failure diagnosis apparatus according to claim 4, wherein the processor is configured to:
    retain the abnormal time in a case where the abnormal time that has been measured until the increase rate becomes smaller than the specified increase rate threshold is equal to or longer than a second specified time, and
    clear the abnormal time in a case where the abnormal time is shorter than the second specified time.

7. The failure diagnosis apparatus according to claim 6, wherein the second semiconductor memory includes a non-volatile semiconductor memory.

8. The failure diagnosis apparatus according to claim 7, wherein the third semiconductor memory includes a volatile semiconductor memory.

9. The failure diagnosis apparatus according to claim 8, wherein the second semiconductor memory includes a hard disk.

* * * * *